(12) United States Patent
Lund et al.

(10) Patent No.: US 9,275,044 B2
(45) Date of Patent: Mar. 1, 2016

(54) METHOD, APPARATUS AND SYSTEM FOR FINDING SYNONYMS

(71) Applicant: SearchLeaf LLC, Provo, UT (US)

(72) Inventors: Thomas Lund, Provo, UT (US); Bryce Lund, Provo, UT (US)

(73) Assignee: SearchLeaf, LLC, Provo, UT (US)

( * ) Notice: Subject to any disclaimer, the term of this patent is extended or adjusted under 35 U.S.C. 154(b) by 225 days.

(21) Appl. No.: 13/787,615

(22) Filed: Mar. 6, 2013

(65) Prior Publication Data

US 2013/0238315 A1 Sep. 12, 2013

Related U.S. Application Data

(60) Provisional application No. 61/607,856, filed on Mar. 7, 2012.

(51) Int. Cl.
*G06F 17/27* (2006.01)
(52) U.S. Cl.
CPC .................................. *G06F 17/2795* (2013.01)
(58) Field of Classification Search
None
See application file for complete search history.

(56) References Cited

U.S. PATENT DOCUMENTS

| 5,940,624 | A | 8/1999 | Kadashevich et al. |
| 6,523,001 | B1 | 2/2003 | Chase |
| 6,535,871 | B1 * | 3/2003 | Romansky et al. |
| 6,829,605 | B2 | 12/2004 | Azzam |
| 7,330,811 | B2 | 2/2008 | Turcato et al. |
| 7,600,186 | B2 | 10/2009 | Saha et al. |
| 7,624,117 | B2 | 11/2009 | Fuerst et al. |
| 7,636,714 | B1 | 12/2009 | Lamping et al. |
| 8,010,342 | B2 | 8/2011 | Uchimoto et al. |
| 2004/0039562 | A1 | 2/2004 | Haase |
| 2005/0171760 | A1 | 8/2005 | Tinkler |
| 2007/0083368 | A1 * | 4/2007 | Handley .................. 704/245 |
| 2011/0251839 | A1 * | 10/2011 | Achtermann et al. ......... 704/9 |
| 2011/0270808 | A1 | 11/2011 | Faruquie et al. |

* cited by examiner

*Primary Examiner* — Jeremiah Bryar
(74) *Attorney, Agent, or Firm* — Snow Christensen & Martineau; Randall B. Bateman; Sarah W. Matthews

(57) ABSTRACT

A method and system are provided for finding synonyms which are more contextually relevant to the intended use of a particular word. The system finds a list of synonyms for the input word and also finds a list of synonyms for an additional word entered by the user to approximate the intended usage of the input word. These two lists of synonyms are compared to find words common to both lists, and the common words are presented to the user as potential synonyms which are appropriate for the intended use.

9 Claims, 3 Drawing Sheets

METHOD, APPARATUS AND SYSTEM FOR FINDING SYNONYMS

THE FIELD OF THE INVENTION

The present invention relates to a method, apparatus and system for generating a list of synonyms for words. More specifically, the present invention relates to a method, apparatus and system for generating a list of synonyms which have a greater contextual relevance for a desired application.

BACKGROUND

Typically, a person looking for the ideal word for a particular use will rely on a thesaurus or similar device to find synonyms for words which convey the same general idea, but do not provide the exact meaning desired. A thesaurus provides a person with a large number of word choices to select a desired synonym to the word originally considered. While each word is a synonym for the original word, some are synonyms for one context of the word and thus not relevant for another context. In many cases, the synonym for a word in one context will make no sense if used to replace the word in another context. This is often apparent in machine translations of text from one language to another. Thus, using a typical thesaurus has the disadvantage that the person (or machine) must select a contextually appropriate word from this list of words which may be relatively unfamiliar to the person. There is a need for a method, apparatus and system for generating a list of synonyms which provides results which are more particularly suited to the application for which the synonym is sought.

SUMMARY OF THE INVENTION

Described herein is an improved method, apparatus and system for generating a list of synonyms.

According to one aspect of the present disclosure, a method is provided which determines synonyms which are more appropriate for the context in which a selected synonym will be used.

According to another aspect of the present disclosure, a method is provided in which a person can input supplemental information in seeking synonyms, and this information may be used to provide a more tailored list of synonyms. This, in turn, may allow for a larger number of relevant synonyms to be presented to the user, thereby improving specificity in selecting the right word and efficiency by avoiding synonyms which are contextually inappropriate.

According to another aspect of the present disclosure, an apparatus such as a machine readable medium may be provided which has programming or instructions to create a list of contextually relevant synonyms.

According to another aspect of the present disclosure, a computer system is provided for finding synonyms quickly and with more contextual accuracy.

These and other aspects are realized in a method, apparatus and system for finding synonyms as shown and described in the following figures and related description.

BRIEF DESCRIPTION OF THE DRAWINGS

Various embodiments of a method, apparatus and system for finding or generating a list of synonyms are shown and described in reference to the numbered drawings wherein.

Figure 1:
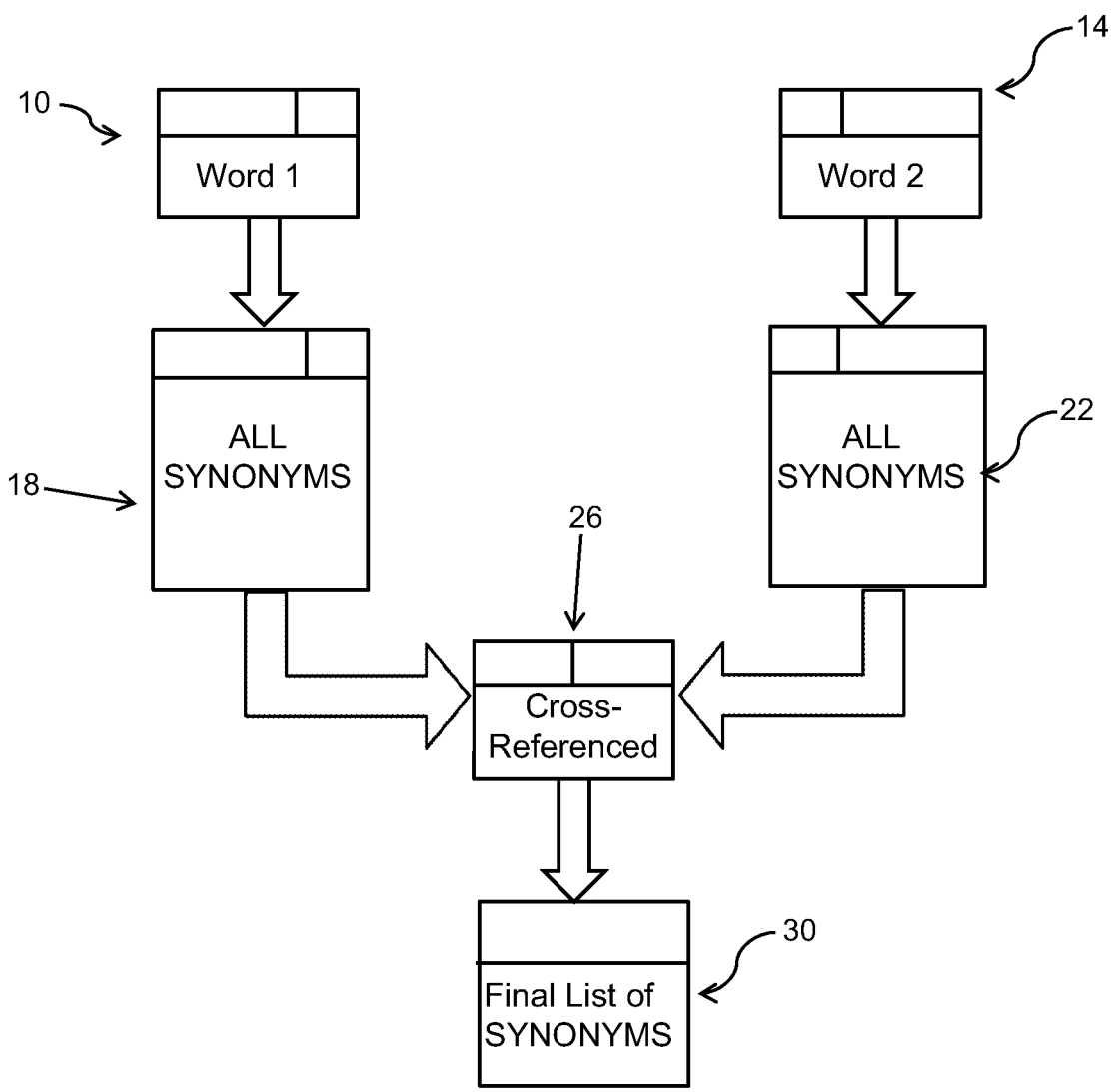
FIG. 1 shows a flowchart exemplifying a method for finding contextually appropriate synonyms.

It will be appreciated that the drawings are illustrative and not limiting of the scope of the invention which is defined by the appended claims. The configurations shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every configuration need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Many of the functional units described in this specification have been labeled as modules, or equivalent functional units, in order to more particularly emphasize their implementation independence. Modules are at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented using software, stored on a physical storage device (e.g., a computer readable storage medium), for execution by various types of processors. Reference to a computer readable storage medium may take any physical form capable of storing machine-readable instructions, at least for a time in a non-transient state, on a digital processing apparatus. Examples of a computer readable storage medium include, but are not limited to, a semiconductor or solid state memory, magnetic tape, a removable computer diskette, a random access memory (RAM), a read-only memory (ROM), a Bernoulli drive, ARDUINO, a magnetic disk, flash memory, integrated circuits, or other digital processing apparatus memory device, and an optical disk. Current examples of optical disks include a compact disk with read only memory (CD-ROM), a compact disk with read/write (CD-R/W), and a digital video disk (DVD).

An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices which are referred to herein as computer readable media and/or electronic data storage devices.

In some configurations, the software portions are stored in a non-transitory state such that the software portions, or representations thereof, persist in the same physical location for a period of time. Additionally, in some configurations the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

Reference throughout this specification to "one configuration," "a configuration," or similar language means that a particular feature, structure, or characteristic described in connection with the configuration is included in at least one configuration discussed in the present disclosure. Thus, appearances of the phrases "in one configuration," "in a configuration," and similar language throughout this specification may, but do not necessarily, all refer to the same configuration.

Furthermore, the described features, structures, or characteristics of configurations of the invention may be combined in any suitable manner in one or more configurations. In the following description, numerous specific details are provided, such as examples of programming, software modules (stored on a physical device), user selections, network transactions, database queries, database structures, hardware modules, hardware circuits, hardware chips, etc., to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled operations are indicative of one configuration of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Although the operations of the methods herein are shown and described in a particular order, the order of the operations of each method may be altered so that certain operations may be performed in an inverse order or so that certain operations may be performed, at least in part, concurrently with other operations. In another configuration, instructions or sub-operations of distinct operations may be implemented in an intermittent and/or alternating manner.

Turning now to FIG. 1, a flowchart illustrating various aspects of an embodiment of the present invention is shown. The various methodologies discussed herein are accomplished through the use of a computer or other machine incorporating a processor. Many of the process steps are performed by a computer or other machine incorporating a processor. It will thus be understood when reading the present disclosure that, even if not explicitly noted, many steps such as determining, comparing, presenting, analyzing, etc. are performed by a processor to produce the desired result. A computer processor or the like is integral to the methodologies described herein, and facilitates the process in a way that a person making calculations or computations could not, as will be explained below.

The method of finding synonyms may use a first input word 10 and a second input word 14, as indicated in FIG. 1. A first input word 10 may typically be the particular word for which a synonym is sought. A second input word 14 is an additional input word which approximates the meaning or context that the person is looking for in a synonym for the first input word 10. The word used for the second input word will not be the exact word the user is looking for, but has contextual similarity which may help the ultimate results to be more contextually appropriate. For example, a person may be looking for a synonym for the word "ball." A substantial number of the synonyms will relate to spherical objects. However, the person may be looking for a synonym for the word "ball" in the context of a dance or gala. The person may thus enter "ball" as the first input word 10 and enter "dance" as the second input word 14. As will be explained in detail below, the user will not get "sphere, orb, globe, globule, drop, pellet, spheroid or bead" as the synonyms. While these words are synonyms of one meaning of the word "ball," they are not contextually appropriate with the second input word 14 entered by the user. A list of synonyms including such contextually distinct terms merely slows down the person as he/she has to sort through synonyms which are not contextually appropriate and look for synonyms that are contextually appropriate. Both of these input words, the first input word 10 and the second input word 14, are used to create a list of synonyms which are contextually suited to the particular application for which the person needs a synonym.

A person may thus enter a first input word (or target word) 10 into an interface of a computer or other machine incorporating a processor to determine a synonym for that word. The interface may be any type of input interface such as a keyboard, touchscreen, microphone, or other input interface. The synonyms may be drawn, for example, from a computer database. The person may then enter a second input word (or contextual word) 14 which approximates or provides context for the meaning desired in the synonym into the interface of a computer, etc. The computer or other machine incorporating a processor generates a list of all synonyms for the first input word 10, as indicated at 18. The computer also generates a list of all synonyms for the second input word 14, as indicated at 22. This may also be done, for example, by accessing a database. It will be appreciated that the database used for the first input word 10 and the second input word 14 may be the same, or different databases may be used.

It will be appreciated that the generation of a list of synonyms may be done by accessing a program stored in memory and accessible by the processor which contains lists of synonyms for a large number of words. It will be appreciated that the memory may be ROM, RAM, flash memory or other storage mechanisms known in the art for holding the information.

The list of synonyms 18 for the target word 10 and the list of synonyms 22 for the contextual word 14 are then compared to each other via the computer or processor. The computer or processor then extracts words which appear in both lists 18 and 22, as indicated at 26, and compiles the words that appear in both lists into a results list 30. The results list 30 is then presented to the person, via a monitor, display or any other human perceptible medium, such as a speaker, etc.

The results list 30 contains a list of words which are appropriately associated in meaning to the first input word, or target word, 10 because all of the words in the results list 30 are synonyms of the first input word 10. The results list 30 also contains words which are appropriate for the context in which the synonym is to be used because they are also all synonyms of the contextual word 14 which was supplied by the person. The second input word, or contextual word, 14 is a word which, while it may not be a synonym of the target word 10 by itself or does not have precisely the meaning intended by the user, has some similarity to the first word so as to help place the target word 10 in context. The second input word 14, for example, may capture a nuance of meaning which is desired, or express a desired application or feature. Because the results list 30 is compiled from synonyms of this second input word 14, the results list 30 presents words which are likely to be appropriate for the desired usage or context.

It will be appreciated that one advantage of the present configuration is that a person can easily check nuances between similar words in context. For example, a person may run the list of synonyms for "ball" and "dance," and then repeat the process with "ball" and "gala" to determine the differences between the resulting lists. Because of the use of the contextual second input word 14, a person can be more assured that any words found are proper for the context in which the synonym will be used.

Figure 2:
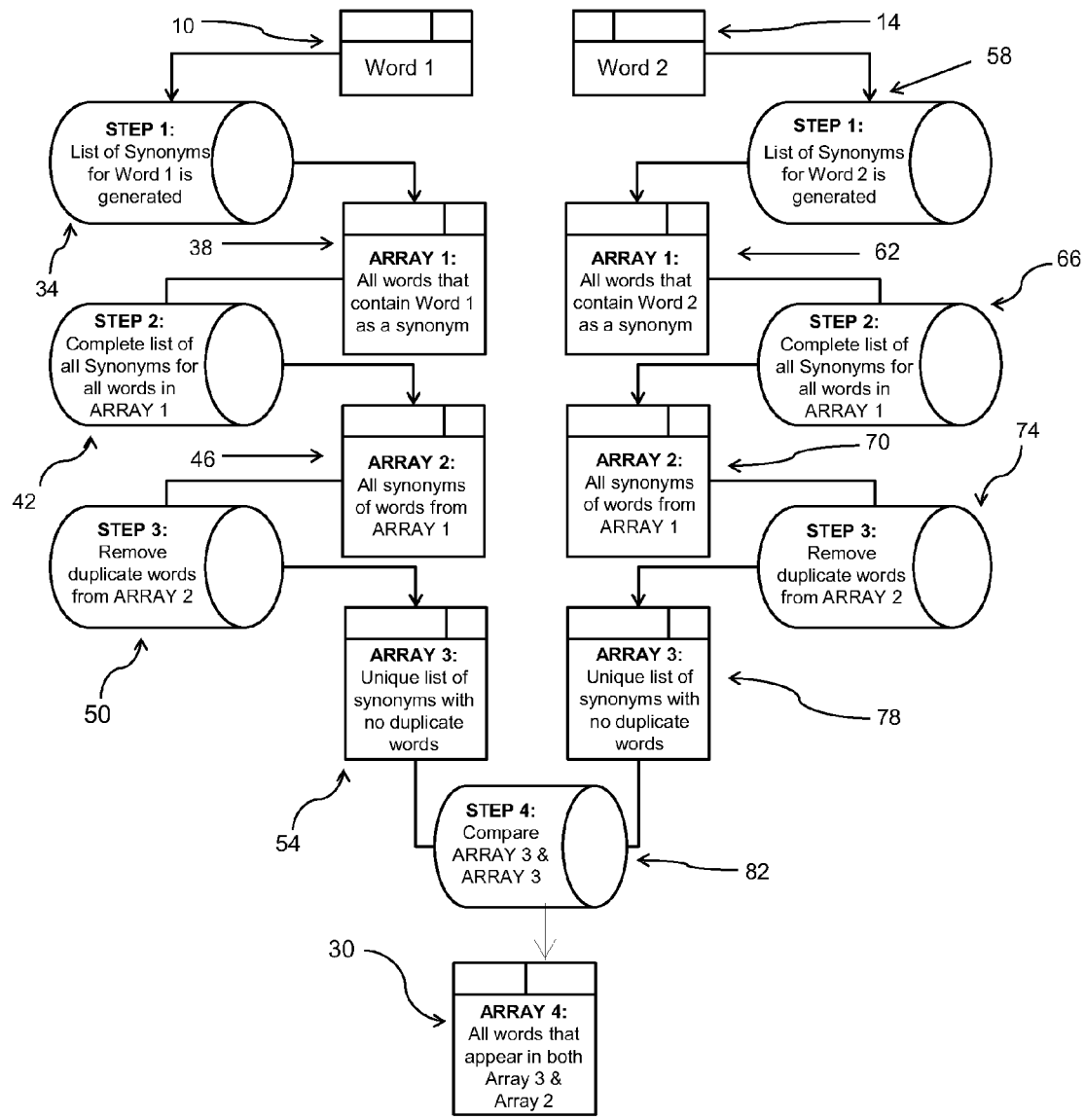
FIG. 2 shows another flowchart exemplifying another method for finding contextually appropriate synonyms.

FIG. 2 shows another flowchart illustrating additional aspects or configurations of the present disclosure. In a manner similar to that discussed above, a first input word (or target word) 10 is entered by a person into a computer or other machine containing a processor or the like. Again, the first input word or target word 10 is a particular word for which a synonym is sought. A second input word (or contextual word) 14 is entered into the computer or other machine containing a processor or the like. The second input word 14 is an additional input word which may approximate the meaning that the person is looking for in a synonym for the target word 10. Both the first input word 10 and the second input word 14 are used to create a list of synonyms which are contextually suited to the particular application for which the person needs a synonym. This may be done by accessing a program stored in memory and accessible by the processor which contains lists of synonyms for a large number of words. It will be appreciated that the memory may be ROM, RAM, flash memory or other storage mechanisms for holding the information. Additionally, it will be appreciated that the synonyms for each of the words entered may be drawn from a single database, or the synonyms for the first input word 10 may be drawn from a first database and the synonyms for the second input word 14 may be drawn from a second database.

The generation of the synonyms may be performed by a computer or other machine including a processor or the like. The computer or other machine including a processor may access a database (as indicated at 34) containing the synonyms. The computer may then (or simultaneously) generate a list or array 38 of all synonyms for the target word 10. In order to create a broader list of words and help ensure that a contextually appropriate synonym for the target word 10 is discovered, the computer may use the same or different database (as indicated at 42) to generate a second list 46 which contains all synonyms of each word contained within list 38. The second list 46 may typically be much larger than the first list 38. A processor of the computer (as indicated at 50) may then process the second list 46 to remove duplicate entries and creates a third list 54 containing an expansive set of synonyms for the target word 10. The set of synonyms contained in the third list 54 may be thought of as a second generation list of synonyms of the target word 10 as it may contain both direct synonyms 38 (the first generation of synonyms) as well as synonyms of these synonyms 46 (the second generation of synonyms).

The computer may access a database or the like (as indicated at 58) and also generate a list 62 of all synonyms for the contextual word 14. In order to create a broader list of words and help ensure that a contextually appropriate synonym for the word 10 is discovered, the computer may access a database or the like (as indicated at 66) to generate a second list 70 which contains all synonyms of each word contained within list 62. The second list 70 is thus much larger than the first list 62. The computer (as indicated at 74) may then process the second list 70 to remove duplicate entries and creates a third list 78 containing an expansive set of synonyms for the contextual word 14. The set of synonyms contained in the third list 78 may be thought of as a second generation list of synonyms of the contextual word 14 as it contains both direct synonyms 62 (the first generation of synonyms) as well as synonyms of these synonyms 70 (the second generation of synonyms).

A computer processor or the like (as indicated at 82) compares the second generation list of synonyms 54 resulting from the target word 10 and the second generation list of synonyms 78 resulting from the contextual word 14. The computer then extracts words which appear in both list 54 and list 78 and compiles these words into a results list 30. The results list 30 is then presented to the person as a list of appropriate synonyms to choose from. Alternatively, the computer may compare all of the first and second generations of synonyms for the target word 10 to the first and second generations of synonyms for the contextual word 14 to compile the results list 30.

As discussed, the results list 30 contains a list of words which are appropriately associated in meaning to the target word 10 because all of them are synonyms (either directly or through the second generation synonyms) of that word. The results list 30 also contains words which are appropriate for the context in which the synonym is to be used since they are also all synonyms (either directly or through the second generation synonyms) of the additional contextual word 14 which was supplied by the person.

According to another configuration, the computer may search for synonyms for the target word 10 by first performing a "first generation" analysis of the target word 10 and contextual word 14 as shown in FIG. 1. If the results list 30 is too small, an empty list, or simply does not contain a desired word, the user may instruct the computer to perform a "second generation" analysis as shown in FIG. 2. In another configuration, the computer could be programmed to automatically perform the "second generation" analysis if the results list 30 is too small or an empty list.

According to another configuration, the computer could be instructed to perform a "third generation" analysis similar to that shown in FIG. 2 where the computer again finds synonyms for each of the words in the second generation synonym lists 54 and 78, eliminates duplicate words, and compares these third generation synonyms to create the results list 30. One having skill in the art would appreciate that by utilizing a computer or device with a processor, additional "generation" analyses could be performed in a short amount of time, such that the user may keep performing additional generation analyses until the desired result word is obtained. The user can also rapidly adjust the results by changing the second input word to more closely align with the context desired.

In another configuration, the computer may simultaneously perform a first generation, second generation, and third generation analysis, and present a results list 30 to the person which is separated or otherwise marked to provide the person with "first generation" results, "second generation" results, and if desired "third generation" results, allowing the person to select the most appropriate synonym for the target word 10 with the additional assistance of knowing the degree of separation between the various synonyms and the target word 10. According to other embodiments, fourth generation results, fifth generation results, etc., could also be performed simultaneously and the computer could present a results list 30 to the person which is separated or otherwise marked to provide the person with "fourth generation" results, "fifth generation" results, etc.

While discussed above as one event occurring after the other, it will be appreciated that the certain steps need not follow in a particular order. For example, the target word 10 could be entered and a list of synonyms run prior to entry or after entry of the contextual word 14. Likewise, the contextual word 14 could be entered and its synonyms generated prior to generating the synonyms for the target word 10. Thus, a statement of order herein is not meant to limit the timing of events unless specifically stated as such. Furthermore, in a further configuration, the contextual word 14 may be selected by the user from list of the synonyms (e.g., first generation, second generation, etc.) corresponding to the target word 10.

Figure 3:
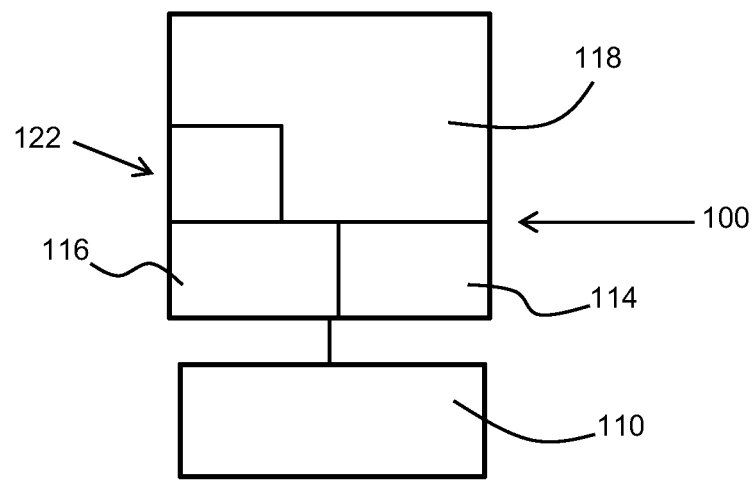
FIG. 3 shows a diagram of a system including a processor which may be used to carry out the configurations described herein.

FIG. 3 shows a diagram of a machine including a processor which may be used to carry out the configurations described herein. It will be appreciated that the computer or other machine containing a processor, generally indicated at 100 may include an input mechanism 110, including one or more of a keyboard, a microphone, a stylus, a mouse, a touch pad or a touch screen; one or more processors 114; a memory 116 having code stored therein for performing the steps discussed; and an output 118, including one or more of a display, monitor, speaker, or interface to some other device. The computer 100 may also include one or more memory devices, such as hard drives 122 which store databases of synonyms for use as explained above. The computer 100 also may include one or more communication interfaces (not shown) to facilitate wired or wireless transmissions with other device, either directly or via a network such as the internet. In some configurations, the computer 100 may access a database of synonyms located remotely from the computer 100 via one or more communication interfaces. Similarly, the user may be remotely located from the computer 100 and interface with the computer 100 via one or more communication interfaces.

Figure 4:
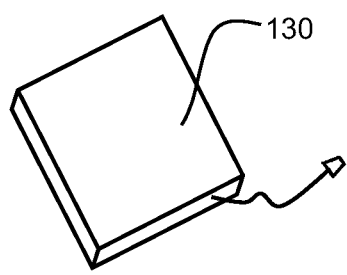
FIG. 4 shows a computer readable medium which is programmed to find and generate a list of contextually appropriate synonyms.

Likewise, it will be appreciated that a computer readable medium, such as shown at 130 in FIG. 4 may contain a medium which is programmed with code or instructions so that when run on a machine containing a processor, the machine receives a first input word and a second input word and generates a list of synonyms for display via an output such as a monitor, etc.

There is thus disclosed an improved method and system for finding synonyms. It will be appreciated that numerous changes may be made to the present invention without departing from the scope of the claims.

What is claimed is:

1. A method for finding synonyms comprising:
    receiving a first input word into a computer;
    receiving a second input word which approximates an intended meaning of the first input word into the computer;
    the computer generating a first generation list of synonyms for the first input word;
    the computer generating a first generation list of synonyms for the second input word;
    generating a combined list of synonyms from the first list of synonyms and the second list of synonyms; and
    the computer generating a second generation list of synonyms for the first input word which contains the synonyms of each word contained within the first generation list of synonyms for the first input word and a second generation list of synonyms for the second input word which contains the synonyms of each word contained within the first generation list of synonyms for the second input word.

2. The method according to claim 1, wherein generating the combined list of synonyms further comprises identifying and populating the combined list of synonyms with only words that are common to both the first list of synonyms and the second list of synonyms.

3. The method according to claim 1, wherein the computer removes duplicate words found in the first generation list of synonyms for the first input word and the first generation list of synonyms for the second input word.

4. The method according to claim 1, wherein the computer removes duplicate words found in the second generation list of synonyms for the first input word and the second generation list of synonyms for the second input word.

5. The method according to claim 1, wherein the computer generates a third generation list of synonyms for the first input word and a third generation list of synonyms for the second input word.

6. The method according to claim 5, wherein the computer removes duplicate words found in the third generation list of synonyms for the first input word and the third generation list of synonyms for the second input word.

7. The method according to claim 1, wherein the computer creates additional lists of synonyms and results if the results list has an inadequate number of entries relative to a threshold.

8. A method for generating synonyms comprising:
    a computing device capable of accessing a database, the database containing synonyms;
    receiving a first input on the computing device and a second input on the computing device;
    the computing device accessing the database and acquiring a first list of synonyms for the first input and a second list of synonyms for the second input;

the computing device comparing the first list and the second list and generating a first generation results list of words comprised of synonyms found for both the first input and the second input;

the computing device accessing the database and acquiring a fourth list of synonyms for the first list and a fifth list of synonyms for the second list;

the computing device processing the fourth list to remove duplicates and thereby generate a sixth list;

the computing device processing the fifth list to remove duplicates and thereby generate a seventh list; and the computing device comparing the sixth list and the seventh list and generating a second generation results list comprised of synonyms found for both the first list and the second list.

9. A non-transitory computer program product comprising a computer readable storage medium to store a computer readable program that, when executed on a computer, causes the computer to perform operations for determining contextually relevant synonyms for a word, the operations comprising:

receiving a first input from a user at a computing device, wherein the first input comprises a first word;

receiving a second input from a user at a computing device, wherein the second input comprises a second word;

accessing a database of synonyms;

generating a first list of synonyms for the first input;

generating a second list of synonyms for the second input;

comparing the first list to the second list for any equivalents;

generating a first generation results list of synonyms, the first generation results list comprising the equivalents from the first list and the second list;

generating a third list of synonyms which contains the synonyms of each word contained within the first list;

processing the third list of synonyms to remove duplicates and thereby generate a fourth list;

generating a fifth list of synonyms which contains the synonyms of each word contained within the second list;

processing the fifth list of synonyms to remove duplicates and thereby generate a sixth list;

comparing the fourth list to the sixth list for any equivalents; and generating a second generation results list of synonyms, the second generation results list comprising the equivalents from the fourth list and the sixth list.

* * * * *